United States Patent [19]

Richardson et al.

[11] 4,173,623

[45] Nov. 6, 1979

[54] HALOGENATION OF LEAD SULFIDE

[75] Inventors: J. Mark Richardson, Tucson, Ariz.; Norbert L. Novinski, II, Houston, Tex.

[73] Assignee: UOP Inc., Des Plaines, Ill.

[21] Appl. No.: 911,613

[22] Filed: Jun. 1, 1978

Related U.S. Application Data

[63] Continuation-in-part of Ser. No. 811,931, Jun. 30, 1977, abandoned.

[51] Int. Cl.$^2$ .............................................. C01G 21/16
[52] U.S. Cl. ...................................... 423/494; 423/94
[58] Field of Search ...................... 423/94, 494, 659 F

[56] References Cited

U.S. PATENT DOCUMENTS

| | | | |
|---|---|---|---|
| 2,007,510 | 7/1934 | Thornton | 423/659 |
| 3,098,074 | 7/1963 | Schoppe | 423/659 |
| 3,304,249 | 2/1967 | Katz | 423/659 |
| 4,011,146 | 3/1977 | Coltrinari et al. | 423/94 |

Primary Examiner—O. R. Vertiz
Assistant Examiner—Wayne A. Langel
Attorney, Agent, or Firm—James R. Hoatson, Jr.; Raymond H. Nelson; William H. Page, II

[57] ABSTRACT

Lead sources, and particularly lead sulfide concentrates, are halogenated utilizing a halogen gas in a dry atmosphere at a relatively low temperature to selectively halogenate the lead. The process is improved by effecting the halogenation in a fluidized state in a fluidized bed reactor, the fluidized state of the lead sulfide being accomplished by introducing a mixture of halogen gas and an oxygen-containing gas at a rate sufficient to maintain the lead sulfide in the desired fluidized state. Thereafter, metallic lead may be obtained by leaching the halogenated mixture with brine, filtering to separate elemental sulfur and residue from soluble lead halide. The soluble lead halide is then crystallized and the desired metallic lead is obtained by fused salt electrolysis.

5 Claims, No Drawings

HALOGENATION OF LEAD SULFIDE

CROSS-REFERENCE TO RELATED APPLICATIONS

This application is a continuation-in-part of our co-pending application Ser. No. 811,931, filed June 30, 1977, now abandoned.

BACKGROUND OF THE INVENTION

In standard methods of obtaining metallic lead from concentrates, the standard procedure has been to treat the lead sulfide concentrates in a blast furnace. However, the pyrometallurgical procedure possesses many disadvantages and drawbacks. Primary among these disadvantages is that the process will result in some major pollution problems such as the generation of sulfur oxide gas along with substantial fuming. The fuming carries with it possible carcinogenic compounds which will contain lead, cadmium, etc. Therefore, it is necessary to provide improved and safer methods for obtaining metals such as lead in metallic or elemental form by methods which will not contribute to pollution of the air or will be safer to operate. The aforementioned lead smelting techniques will consist of roast sintering the lead sulfide concentrate whereby a major portion of the sulfur will be removed followed by melting in a blast furnace to obtain the metallic lead.

In an effort to alleviate the pollution problem, it is necessary to develop new processes for obtaining lead which will be competitive as an alternative to the conventional smelting practices. Prior work in the hydrometallurgical field resulted in developing a non-aqueous processing route whereby lead sulfide concentrates are chlorinated at temperatures above 300° C. to produce lead chloride and volatilized sulfur. However, chlorination at these elevated temperatures will promote formation of volatile chlorides of contaminating elements such as iron, magnesium, aluminum, silicon, and zinc, as well as elemental sulfur which may be present in the lead sulfide concentrate. Other hydrometallurgical processes which have been developed include the use of ferric sulfate as a leach agent. In this method, the lead sulfide is sulfated to form lead sulfate. This step is then followed by carbonation of the lead sulfate to form lead carbonate and thereafter the lead carbonate is subjected to dissolution in hydrofluosilicic acid for electrolysis to metallic lead. Yet another hydrometallurgical method which is developed for the recovery of lead is based on the use of an acidic ferric chloride medium. This method involves a leaching step whereby the lead sulfide is converted to lead chloride and thereafter subjected to steps of solubilizing, crystallization and electrolysis.

The prior art which discloses other processes for converting a lead sulfide to elemental or metallic lead is also exemplified by U.S. Pat. No. 1,491,653. This reference describes the use of chlorides of sulfur and in particular sulfur monochloride to selectively chlorinate lead sulfide in a complex lead-zinc sulfide ore at temperatures ranging from 50° to about 150° C. However, in this method of operation, the solids are reacted in a solution of sulfur monochloride to form a slurry. A disadvantage which is present when utilizing such a system is that certain metal sulfides are solubilized due to the dissolution of sulfur into the slurry, this dissolution being due to the wide range of compositions of sulfur chlorides. Such an action can lead to the dissolution of some metal sulfides thereby rendering the process more complex in nature. In addition to this type of operation, another metal recovery system utilizes a dry chlorination of complex sulfides in a two-stage process. The first stage consists in a countercurrent chlorination of the ore in a tube mill with chlorine gas, the temperatures of this process usually being in a range of from about 100° to about 150° C. to insure chlorination of from about 40% to about 70% of the metals. The important step in this stage is the chlorination of iron which serves as a source of chlorine in the second step. The second step of this two-stage process consists in a chloridizing roast wherein the final chlorination is accomplished to convert all metals present in the ore to chlorides. Much of this reaction is done by the release of chlorine by the oxidation of the initially formed ferric chloride to ferric oxide and chlorine. Following this, the metal chlorides are then leached in water and brines in order to solubilize the metals. However, the chloridizing roast to produce ferric chloride will also produce sulfur and sulfur chlorides as well as oxides, the roast temperatures which are necessary to accomplish this being above 138° C. and probably above 150° C.

One example of the two step process is found in U.S. Pat. No. 4,011,146. In this reference a dry chlorination of a sulfide ore is conducted in which the products which are formed during the aforesaid drying chlorination step are contacted with an inert sweep gas such as nitrogen to convert any sulfur chlorides which are formed to metal chlorides and elemental sulfur. The patent teaches that the lead sulfide present in the ore is converted by an exothermic reaction to lead chloride and, therefore, some cooling must be effected or in the alternative inert materials must be added.

As will hereinafter be set forth in greater detail, it has now been discovered that a lead sulfide source may be subjected to halogenation in the presence of an oxygen-containing gas which is substantially inert to the environment to provide a fluidized bed for the halogenation reaction. By utilizing this fluidized bed, it will be possible to effect a more thorough halogenation of the lead sulfide source with a concomitant increase in the yield of the desired lead.

This invention relates to an improvement in a hydrometallurgical process for the recovery of metallic lead. More specifically, the invention is concerned with an improved process for the halogenation and particularly chlorination of a lead sulfide concentrate wherein the halogenation is effected in a fluidized bed reactor in either a batch or continuous type of operation.

It is therefore an object of this invention to provide an improved process for the halogenation of lead-containing sources.

A further object of this invention is to provide an improvement in the chlorination of a lead sulfide concentrate whereby a more efficient mixing of gas-solids which is a requirement of the reaction is effected.

In one aspect an embodiment of this invention resides in a process for the halogenation of a lead sulfide which comprises halogenating said lead sulfide at an elevated temperature with a halogen gas in a dry atmosphere, the improvement which comprises halogenating said lead sulfide in a fluidized bed with said halogen gas, said fluidized bed being effected by the introduction of a gas consisting essentially of a mixture of said halogen gas and an oxygen-containing gas at a rate of from about 4 centimeters per second to about 12 centimeters per second to said lead sulfide within said fluidized bed, wherein the oxygen in said oxygen-containing gas is substantially inert to said halogenation within said fluidized bed.

A specific embodiment of this invention resides in the process for the halogenation of a lead sulfide in which said lead sulfide is chlorinated at a temperature in the range of from about 90° to about 120° C. with chlorine gas in a dry atmosphere, said halogenation being effected in a fluidized bed operation which is afforded by the introduction of a gas consisting essentially of a mixture of said chlorine gas and air at a rate of from about 4 centimeters per second to about 12 centimeters per second, said chlorine gas being present in said mixture in a ratio of from about 0.01:1 to about 0.2:1 parts by volume of chlorine gas per part of said air.

Other objects and embodiments will be found in the following further detailed description of the present invention.

As hereinbefore set forth the present invention is concerned with an improvement in a process for the halogenation of a lead source such as lead sulfide concentrates. When subjecting a lead source such as a lead sulfide concentrate to a halogenation reaction, a certain degree of care must be taken to control the temperature inasmuch as the halogenation reaction is exothermic in nature. The exothermicity of the reaction can be readily controlled in a batch type operation, a usual method being by controlling the rate of the addition of the halogen gas. However, when utilizing a fluidized reaction in order to insure a more effective or efficient mixing of the gas and the concentrates or solids thereby permitting a higher halogenation of the lead in the lead sulfide, it is difficult to maintain a controlled flow of the halogen gas without permitting the exothermic nature of the reaction to take over. It has, therefore, now been discovered that by introducing a mixture of halogen gas and a gas which is inert or is not involved in the halogenation reaction, into the reaction zone, it is possible to maintain the solid lead sulfide concentrate in a fluidized state while controlling the temperature of the reaction within the desired range.

In the preferred embodiment of the invention the halogenation of the lead source with a halogen gas such as chlorine gas, bromine gas, fluorine gas is effected in a dry atmosphere at temperatures in the range of from about 90° to about 120° C., this temperature range being necessary in order to effect a selective halogenation of the lead in the concentrate while avoiding the halogenation of the other materials which are present such as iron, copper, cadmium, zinc, etc. The aforementioned mixture of halogen gas and a gas which is inert to the reaction may be in a ratio of from about 0.01:1 to about 0.2:1 parts by volume of the halogen gas per part of inert gas. The gas which may be employed in admixture with the halogen gas and which is substantially inert to the halogenation within the fluidized bed comprises an oxygen-containing gas in which the oxygen may be present as free oxygen or as bonded oxygen, examples of these gases comprising air, carbon monoxide, carbon dioxide, etc. The preferred gas which is substantially inert and which is not involved in the halogenation reaction comprises air due to its greater availability and inexpensive nature. As hereinbefore set forth, the mixture of the halogen gas and the inert gas is charged to the reaction apparatus which comprises a fluidized bed reactor at a rate which is sufficient to maintain the solid concentrate in a fluidized state. Therefore, the rate of addition of the mixture of gases must be carefully controlled inasmuch as if the gas is admitted at too low a rate there will be no fluidity of the particles. Conversely, if the gas is charged at too high a rate the result will be a carry-over of dust which is detrimental to the reaction and to the apparatus involved thereto. Therefore, it has been found that the introduction of the mixture of halogen gas and inert gas to the reactor is effected at a rate in the range of from about 4.0 to about 12.0 centimeters/second, the preferred rate being in a range of from about 6.5 to about 9.0 centimeters/second.

By utilizing this mixture of halogen gas and inert gas, it is possible to utilize either a batch type reaction or a continuous type reaction for the halogenation of lead sulfides. When utilizing a batch type operation, the solid lead value source such as lead sulfide concentrate may be introduced into the fluidized bed reactor in particulate form through conventional means such as a screw conveyor, rotary valve, doubling pinch valve or any similar air-lock systems. Thereafter the mixture of halogen gas such as chlorine gas and inert gas such as air wherein the halogen gas and inert gas are present in the mixture in a range hereinbefore set forth may be introduced at a controlled rate which is sufficient to maintain the particulates in a fluidized state. The reactor is then heated to the desired temperature, following which the temperature is maintained by controlling the amount of halogen gas which is introduced into the fluidized mixture at a rate which is sufficient to control the exothermicity of the reaction. Upon completion of the desired halogenation reaction, which may range from about 0.1 up to about 4 hours or more in duration, the halogenated lead material may then be removed from the system in a similar manner and thereafter subjected to a series of steps hereinafter set forth in greater detail to recover the desired lead.

In addition to utilizing a batch type operation, it is also contemplated within the scope of this invention that the halogenation of the lead sulfide may also be effected in a continuous manner of operation. When such a type of operation is employed, the lead sulfide concentrate is continuously charged to a series of reactors by means similar to that hereinbefore set forth, that is, a screw conveyor, rotary valve, etc., at a predetermined rate. At the same time, a mixture of halogen gas and inert gas is also continuously charged to the reactors which are maintained within the desired operating temperature range in such a manner so as to afford a countercurrent flow of the gases and the solids. After passage through the reactors for a time sufficient to effect the desired halogenation of the lead sulfide, the particles are then also continuously removed through similar means and passed to the subsequent steps for recovery of lead. By utilizing this type of reaction, it is possible to control the heat of the reaction by either controlling the amount of halogen gas which is introduced into the fluidization zone, controlling the amount of inert gas which is introduced as a diluent or by controlling the temperature of the off-gas from the reactors by passing it through a heat exchanger and recycling said off-gas to be mixed with fresh make-up gas at the bottom of the bed.

The lead source which has been subjected to the halogenation, and particularly chlorination, step may then be subjected to a series of further steps in order to obtain the desired metallic lead. For example, after halogenating the lead sulfide concentrate in a dry atmosphere, the term "dry atmosphere" referring to atmospheres or lead-containing sources which possess a water content not greater than about 0.5%, is then leached by the addition of a brine solution at an elevated temperature usually in the range of from about 80° to about 120° C. The leaching of the mixture with said brine solution which usually comprises an aqueous sodium chloride solution containing from about 20 to about 35% by weight of sodium chloride is effected for a period of time which may range from about 0.25 up to about 2 hours or more in duration, the residence time which is required being that which is sufficient to dissolve the lead halide. Upon completion of the leaching step, the solution may then be filtered while maintaining the temperature at an elevated range of from about 80° to about 120° C. whereby the lead halide is maintained in a soluble form. The filtrate, which contains the soluble lead halide, may then be passed to a crystallization zone wherein the soluble lead halide is crystallized due to a drop in the temperature, the temperature of the crystallization zone being maintained at a temperature somewhat lower than the leach temperature by external cooling means such as a heat exchanger. For example, typical crystallization temperatures would be between about 60° C. and ambient (20°-25° C.).

The thus crystallized lead halide may then be recovered and dried to remove any trace of water which may still be present, the drying being effected, for example, by placing the lead halide in an oven and subjecting said halide to a temperature of about 100° C. in an atmosphere of air for a period of time ranging from about 0.1 to about 4 hours or more. Following the drying of the lead halide, it is then placed in an appropriate apparatus and subjected to a temperature sufficient to melt said halide until it assumes a molten form. The temperature which is utilized to effect this melt may range from about 380° C. which is sufficient to melt lead bromide up to about 875° C. which is sufficient to melt lead fluoride. Following this, the lead halide in molten form may then be admixed with the salt of a metal selected from the group consisting of alkali metals and alkaline earth metals such as lithium chloride, sodium chloride, potassium chloride, cesium chloride, magnesium chloride, calcium chloride, barium chloride, sodium bromide, potassium bromide, rubidium bromide, beryllium bromide, calcium bromide, sodium fluoride, potassium fluoride, etc., in a fused salt bath. If so desired, the salt of the alkali metal or alkaline earth metal will be comparable in the halide content to the lead halide which is to undergo electrolysis. The thus formed fused salts are then subjected in a fused salt bath to electrolysis utilizing a sufficient voltage to effect said electrolysis whereby metallic lead is deposited as a liquid which can be removed from the fused salt and recovered.

The following examples are given for purposes of illustrating the process of the present invention. However, it is to be understood that these examples are given merely for purposes of illustration and that the present invention is not necessarily limited thereto.

EXAMPLE I

As an illustration of the applicability of a mixture of halogen gas and inert gas to effect a halogenation of a lead source, a series of experiments was performed on a lead sulfide concentrate. The apparatus which was utilized in these experiments consisted of a Pyrex reaction vessel with a coarse porosity frit at the bottom to disperse the fluidizing gas. The reactor was provided with a thermocouple placed in a thermowell to measure the temperature of the reaction and a port for sampling the bed solids which was located opposite the thermowell adjacent to the top of the reactor. In addition, the apparatus was also provided with an expansion chamber, a miniature cyclone and a caustic scrubber which was used to clean the off-gas from the reactor. The expansion chamber and cyclone were used to remove particulates from the gas while the caustic solution in the scrubber was used to remove residual chlorine and sulfur chlorides from the off-gas. A sample consisting of 600 grams of the lead sulfide concentrate in particulate form was poured into the fluidizing zone of the reactor. The lead sulfide was then fluidized with air and the fluidizing zone was heated using a 1000 watt electric heat gun. When the temperature reached 95° C. a mixture of chlorine gas and air was charged to the reactor. Although most of the heat necessary to maintain the temperature was supplied by the exothermic nature of the reaction, external heat was added occasionally to maintain the temperature in the desired range, that is, 100°-110° C. Samples of the bed of solids were obtained through the port at intervals during each test and analyzed to determine the amount of lead sulfide which had been converted to lead chloride. It was found that the feed solids changed color from black to yellowish-gray during the reaction, the extent of color change being used to judge the length of each test. Upon completion of the reaction, the chlorine flow was terminated while air flow was maintained to cool the reactor. When the reaction vessel had cooled to room temperature, the final product was recovered, weighed and analyzed. The results of three tests using this method are set forth in Table I below:

TABLE 1

| Test No. | Time, Min. | Cl$_2$/Air Vol. Ratio | Gas Velocity, Cm/Sec. | % Lead Converted |
|---|---|---|---|---|
| A | 0–10 | 0.021 | 8.03 | — |
| | 10–20 | 0.033 | 8.12 | 4.8 |
| | 20–65 | 0.042 | 8.20 | 22.4 |
| | 65–95 | 0.054 | 8.29 | 40.1 |
| | 95–125 | 0.065 | 8.36 | 56.6 |
| | 125–155 | 0.075 | 8.46 | 60.4 |
| | 155–185 | 0.084 | 8.52 | 65.2 |
| B | 0–10 | 0.021 | 7.27 | — |
| | 10–20 | 0.032 | 7.35 | — |
| | 20–60 | 0.041 | 7.41 | 43.0 |
| | 60–90 | 0.052 | 7.49 | 76.4 |
| | 90–120 | 0.064 | 7.57 | 92.2 |
| | 120–150 | 0.075 | 7.66 | 91.1 |
| C | 0–20 | 0.014 | 6.47 | — |
| | 20–30 | 0.032 | 6.59 | — |
| | 30–60 | 0.042 | 6.65 | — |
| | 60–90 | 0.052 | 6.72 | 56.0 |
| | 90–120 | 0.063 | 6.78 | 87.2 |
| | 120–150 | 0.074 | 6.85 | 94.9 |

EXAMPLE II

To illustrate the fact that the process of the present invention may also be used in a continuous manner of operation, a second experiment was performed in which a continuous operation was simulated. The feed for this test was prepared by blending 315 grams of a fresh dry lead sulfide concentrate with 315 grams of a lead sulfide concentrate that was 98% chlorinated. A head sample of the blend was submitted for assay and 600 grams of the blend were then used in the test. The test was run for a period of 2 hours using conditions similar in nature to those set forth in Example I above. The exothermic heat of the reaction was less than that found in Example I and constant heating was necessary to maintain the temperature of the reaction within the desired range. The results of this test are set forth in Table II below. These results indicate that the initial conversion rate of lead was relatively high.

TABLE II

| Test No. | Time, Min. | Cl₂/Air Vol. Ratio | Gas Velocity, Cm/Sec. | % Lead Converted |
|---|---|---|---|---|
| D | 0–25 | 0.065 | 7.62 | — |
| | 25–50 | 0.077 | 7.71 | 70.6 |
| | 50–75 | 0.090 | 7.80 | 72.4 |
| | 75–100 | 0.102 | 7.88 | — |
| | 100–120 | 0.113 | 7.69 | 79.4 |

EXAMPLE III

In this example a lead bearing source which contained a mixture of lead sulfide, copper sulfide, iron sulfide and zinc sulfide was chlorinated at a temperature of 100° C. in a dry atmosphere which did not contain more than about 0.5% of water. The chlorination was effected by passing a mixture of chlorine gas and air over the metal sulfide mixture at a rate of 100 cc/min. of chlorine and 800 cc/min. of air. Upon completion of the chlorination step, the product was analyzed by means of atomic absorption principles.

In contradistinction to this, a chlorination step was effected utilizing the method as set forth in U.S. Pat. No. 1,491,643. A lead concentrate sample similar in nature to that set forth in the above paragraph was slurry leached in an agitated magnetically stirred apparatus, filtered and washed with fresh sulfur monochloride according to the method set forth in the patent. Thereafter, the product was again analyzed by means of atomic absorption principles. The results of the two chlorination steps are set forth in Table III below:

TABLE III

| Metal Sulfide | Dry Cl₂ Conversion | Sulfur Monochloride Conversion According To U.S. 1,491,643 |
|---|---|---|
| Pb | 90.4% | 75% |
| Cu | 23.7% | 51% |
| Fe | 12.7% | 25% |
| Cd | — | 32% |
| Zn | 5.0% | 29% |

It is readily apparent from a comparison of the chlorination conversions of the two methods as set forth in the above table that the dry chlorination step set forth in the present application is considerably more selective for lead than is the chlorination conversion of the U.S. patent. In addition to this more selective conversion, another advantage which is present in the instant application is that no slurry is required to be treated or filtered as must be done in the method set forth in the U.S. patent.

EXAMPLE IV

To illustrate the fact that in order to obtain a greater selectivity of halogenation, and particularly chlorination, of lead in metal bearing sources such as those ores containing lead sulfide, zinc sulfide, ferrous sulfide, copper-iron sulfide, iron-arsenic sulfide, etc., can be obtained at relatively low temperatures, Table IV below contains data which was set forth in two Bureau of Mines Publications, the first being RI-5894 titled "Chloridizing The Sulfides Of Lead, Zinc And Copper," and the second, RI-6052 titled "Chloridization Of Certain Mineral Sulfides."

TABLE IV

| | | Temp. (°C.) | % Chlorination |
|---|---|---|---|
| A. | Sphalerite (ZnS) | 124 | 11 |
| | | 250 | 20 |
| | | 400 | 34 |
| | | 500 | 42 |
| | | 600 | 100 |
| B. | Pyrite (FeS₂) | 100 | 12 |
| | | 150 | 21 |
| | | 200 | 72 |
| | | 250 | 96 |
| | | 300 | 100 |
| C. | Chalcopyrite (CuFeS₂) | 100 | 7 |
| | | 200 | 82 |
| | | 300 | 100 |
| D. | Arsenopyrite (FeAs S) | 150 | 0 |
| | | 200 | 40 |
| | | 250 | 66 |
| | | 300 | 90 |
| | | 400 | 100 |

It is therefore shown in Tables III and IV that by utilizing a relatively low temperature as taught in the process of the present invention, that is, from about 90° to about 120° C., in the chlorination of a mixture of metal sulfides while employing gas as a chlorinating agent and in a dry atmosphere containing less than about 0.5% water, it is possible to selectively chlorinate lead sulfide to lead chloride while leaving the other metal sulfides relatively unaffected. This selective chlorination facilitates the separation of the desired lead chloride from impurities in subsequent steps.

We claim as our invention:

1. In a process for the halogenation of a lead sulfide which comprises halogenating said lead sulfide at an elevated temperature with a halogen gas in a dry atmosphere, the improvement which comprises halogenating said lead sulfide in a fluidized bed with said halogen gas, said fluidized bed being effected by the introduction of a gas consisting essentially of a mixture of said halogen gas and air at a rate of from about 4 centimeters per second to about 12 centimeters per second to said lead sulfide within said fluidized bed, wherein the oxygen in said air is substantially inert to said halogenation within said fluidized bed, said halogen gas being present in said mixture in a ratio of from about 0.01:1 to about 0.2:1 parts by volume of halogen gas per part of said air.

2. The process as set forth in claim 1 in which said elevated temperature is in a range of from about 90° to about 120° C.

3. The process as set forth in claim 1 in which said halogen gas is chlorine gas.

4. The process as set forth in claim 1 in which said halogen gas is bromine gas.

5. The process as set forth in claim 1 in which said halogen gas is fluorine gas.

* * * * *